(12) United States Patent
Choi et al.

(10) Patent No.: US 10,805,766 B2
(45) Date of Patent: Oct. 13, 2020

(54) METHOD FOR PROVIDING MOBILE-COMMUNICATION-BASED NAVIGATION SERVICE SUPPORTING EMERGENCY RESCUE AND SERVICE SERVER USING THE SAME

(71) Applicant: Electronics and Telecommunications Research Institute, Daejeon (KR)

(72) Inventors: Jae-Hyuk Choi, Daejeon (KR);
Joo-Young Kim, Daejeon (KR);
Young-Su Cho, Daejeon (KR);
Myung-In Ji, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 112 days.

(21) Appl. No.: 16/176,697

(22) Filed: Oct. 31, 2018

(65) Prior Publication Data
US 2019/0132701 A1 May 2, 2019

(30) Foreign Application Priority Data

Nov. 1, 2017 (KR) .......................... 10-2017-0144910
Jan. 5, 2018 (KR) .......................... 10-2018-0001701

(51) Int. Cl.
*G01C 21/34* (2006.01)
*H04W 4/024* (2018.01)

(52) U.S. Cl.
CPC ........ *H04W 4/024* (2018.02); *G01C 21/3407* (2013.01); *G01C 21/3438* (2013.01); *G01C 21/3492* (2013.01)

(58) Field of Classification Search
CPC .. G01C 21/28; G01C 21/343; G01C 21/3438; G08G 1/096816
See application file for complete search history.

(56) References Cited

U.S. PATENT DOCUMENTS

| | | | |
|---|---|---|---|
| 9,460,603 B2 | 10/2016 | Hamano et al. | |
| 10,378,911 B1* | 8/2019 | Ledet | G03H 1/2249 |
| 2005/0137797 A1* | 6/2005 | Oesterling | G08G 1/205 |
| | | | 701/420 |
| 2011/0046878 A1* | 2/2011 | Sung | G01C 21/28 |
| | | | 701/467 |

(Continued)

FOREIGN PATENT DOCUMENTS

| | | |
|---|---|---|
| JP | 2007172240 A | 7/2007 |
| JP | 5739467 B2 | 9/2014 |

(Continued)

OTHER PUBLICATIONS

Navigation Service Framework, OMA-ER-NavSe-V1.0, Mar. 14, 2018, p. 1-30, Open Mobile Alliance.

(Continued)

*Primary Examiner* — Kenneth J Malkowski
(74) *Attorney, Agent, or Firm* — William Park & Associates Ltd.

(57) ABSTRACT

Disclosed herein are a mobile-communication-based navigation service method for supporting emergency rescue and a service server using the method. The present invention relates to provision of an interactive navigation service between a rescuer and a person who needs to be rescued in a mobile-communication-based navigation service method for supporting emergency rescue.

10 Claims, 8 Drawing Sheets

(56) References Cited

U.S. PATENT DOCUMENTS

| | | | |
|---|---|---|---|
| 2012/0150444 A1 | 6/2012 | Hong et al. | |
| 2013/0211718 A1 | 8/2013 | Yoo et al. | |
| 2015/0338220 A1* | 11/2015 | Choi | G01C 21/26 701/537 |
| 2016/0216125 A1* | 7/2016 | Ahn | G06Q 50/30 |

FOREIGN PATENT DOCUMENTS

| | | |
|---|---|---|
| KR | 101339017 B1 | 12/2013 |
| KR | 1020150091824 A | 8/2015 |

OTHER PUBLICATIONS

RESTful Network API for Navigation Service Framework, OMA-TS-REST_NetAPI_NavSe-V1_0, Mar. 14, 2018, p. 1-139, Open Mobile Alliance.

* cited by examiner

METHOD FOR PROVIDING MOBILE-COMMUNICATION-BASED NAVIGATION SERVICE SUPPORTING EMERGENCY RESCUE AND SERVICE SERVER USING THE SAME

CROSS REFERENCE TO RELATED APPLICATIONS

This application claims the benefit of Korean Patent Application No. 10-2017-0144910, filed Nov. 1, 2017, and No. 10-2018-0001701, filed Jan. 5, 2018, which are hereby incorporated by reference in their entirety into this application.

BACKGROUND OF THE INVENTION

1. Technical Field

The present invention relates generally to a navigation service based on mobile communication, and more particularly to provision of an interactive navigation service between a rescuer and a person who needs to be rescued in a mobile-communication-based navigation service that supports emergency rescue.

2. Description of the Related Art

The statements in this section merely provide background information related to the following embodiment and do not necessarily constitute the conventional art.

Among various services based on mobile communication, the market for navigation service has been growing, which has led to the release of various navigation services. In the case of an outdoor navigation service, such as a vehicle navigation service or the like, there is a well-defined standard therefor, and various services based on the corresponding standard have been released and are widely used. However, in the case of an indoor navigation service, although a few services have been released in response to the increasing demand, service areas are limited, and the proliferation and activation of such service is slow. Further, the lack of a standard related to an indoor navigation service impedes the development of a seamless outdoor/indoor navigation service, and as a result, few services related thereto are provided.

Also, there is demand for a navigation service for rescue workers and people in need of rescue in an emergency situation. However, the navigation service currently being provided may not meet such a demand. Accordingly, it is necessary to consider a navigation service for emergency rescue.

In order to meet such demand, the Open Mobile Alliance (OMA) is working on standardization of Navigation Service Framework (NavSe) v1.0, which is a standard for a navigation service framework. In order to provide a navigation service based on mobile communication, the NavSe v1.0 standard aims to define a framework for providing users with functions for a navigation service for emergency rescue along with route and traffic information for a vehicle navigation service and route information for an indoor navigation service.

In the NavSe v1.0 standard, route and traffic information is configured by reusing the already defined and used standard, rather than defining a new standard. Specifically, route and traffic information for a vehicle navigation service is configured using a TPEG standard defined by ISO, which is widely used in the market. Route information for an indoor navigation service is configured using an IndoorGML standard defined by OGC. IndoorGML is a standard for modeling indoor spaces for the purpose of navigation, but does not include a standard for clearly delivering space information related to a route modeled for an indoor navigation service. The NavSe v1.0 standard provides standardized route and traffic information through ISO TPEG and OGC IndoorGML standards so that users can be provided with indoor and outdoor navigation services. Also, functions for a navigation service that is capable of providing a route in an emergency situation such that a person who requests rescue may reach a safe place are under discussion in connection with the NavSe v1.0 standard.

SUMMARY OF THE INVENTION

Embodiments of the present invention propose a method for providing an interactive navigation service between a rescue worker and a person who requested rescue and functions of a navigation service server for implementing the method in a mobile-communication-based navigation service that supports emergency rescue.

According to an aspect of the present invention, there is provided a method in which a navigation service server provides a shared route service to clients. The method includes creating a first trip resource in response to a request from a first client to create a representation of a trip from the first client to a second client; creating resources for representing route information matching the first trip resource and traffic information related thereto; creating a second trip resource for representing a trip to the first client, which corresponds to the first trip resource, regardless of whether or not the second client makes a request; and creating resources for representing route information matching the second trip resource and traffic information related thereto. Here, the destination of the trip to the second client is set to an identifier of the second client, and a destination of the trip to the first client is set to the position of the first client.

An embodiment of the method may include one or more of the following features.

In some embodiments, the method may further include acquiring position information of the second client corresponding to the identifier thereof from an external entity over a network.

In some embodiments, the method may further include delivering a URL through which the second trip resource is accessible to the second client. Here, the second trip resource includes a parameter that represents a link to the resources for representing the route information matching the second trip resource and the traffic information related thereto.

In some embodiments, the second client may acquire parameters of the second trip resource by performing a hypertext transfer protocol (HTTP) GET operation for the URL, and may receive the route information and the traffic information using the HTTP GET operation for the link to the resources for representing the route information matching the second trip resource and the traffic information related thereto.

In some embodiments, the route information matching the first trip resource may include an indicator for instructing the first client to modify a parameter in the first trip resource that represents position information of the first client when the first client enters a new segment. Likewise, the route information matching the second trip resource may include an indicator for instructing the second client to modify a parameter in the second trip resource that represents position information of the second client when the second client enters a new segment.

In some embodiments, the method may further include, when modification of a parameter in the first trip resource that reports deviation of the first client from a route in use is recognized, calculating, by the navigation service server, a new route matching the current position of the first client and notifying the first client and the second client of the URL of the new route.

In some embodiments, the method may further include sending, by the navigation service server, a notification message to the second client when modification of a parameter in the first trip resource that reports entry of the first client into a new segment in a route in use is recognized. Here, the notification message may include position information of the first client, information about travel time remaining until the first client and the second client meet, and a distance between the first client and the second client.

In some embodiments, the method may further include sending, by the navigation service server, position information of the first client to the second client and sending, by the navigation service server, position information of the second client to the first client when modification of a parameter in the first trip resource and a parameter in the second trip resource that report entry of the first client and the second client into the same segment is recognized.

According to another aspect of the present invention, there is provided a method in which a navigation service server provides a shared route service to clients, the method including allocating data storage for a representation of a first trip from a first client to a second client in response to a request from the first client to create the representation of the first trip. Here, the data storage may be allocated in order to store parameters of the first trip, the representation of the first trip may include a related URL, the parameters of the first trip may include an origin and a destination, and the destination may be set to an identifier of the second client.

The method may further include allocating data storage for each of a representation of a route calculated for the first trip and a representation of traffic information related to the calculated route; and allocating data storage for a representation of a second trip from the second client to the first client regardless of whether or not the second client makes a request. Here, the data storage may be allocated in order to store parameters of the second trip, the representation of the second trip may include a related URL, the parameters of the second trip may include an origin and a destination, and the destination may be set to the origin of the first client. The method may further include allocating data storage for each of a representation of a route calculated for the second trip and a representation of traffic information related to the calculated route.

According to a further aspect of the present invention, there is provided a navigation service server for providing a shared route service to clients, the navigation service server including at least one processor, data storage, and memory including instructions. When the instructions are executed by the processor, the processor is made to perform the above-described methods.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
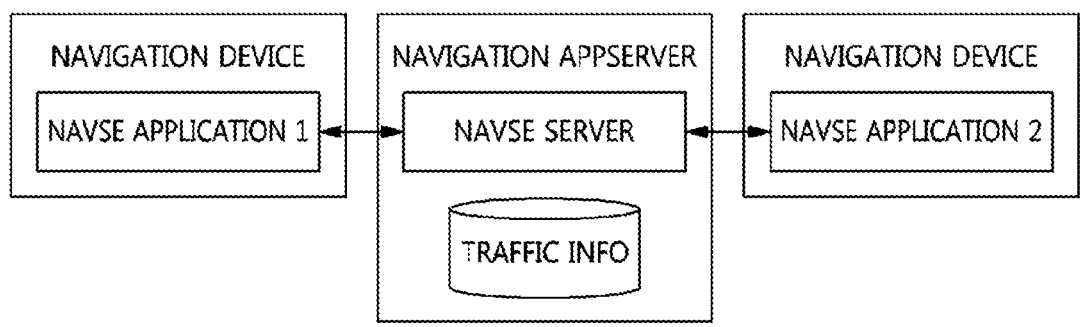
FIG. 1 is a view that shows a scenario for deploying a navigation system to which the methods according to the present invention may be applied.

Hereinafter, embodiments of the present invention will be described in detail with reference to the accompanying drawings. It should be noted that the same reference numerals are used to designate the same or similar elements throughout the drawings. In the following description of the present invention, detailed descriptions of known functions and configurations which are deemed to make the gist of the present invention obscure will be omitted.

Various terms, such as "first", "second", "A", "B", "(a)", "(b)", etc., can be used to differentiate one component from another, but the substance, order or sequence of the components are not limited by the terms. Throughout this specification, the terms "comprises" and/or "comprising", and "includes" and/or "including" specify the presence of stated elements but do not preclude the presence or addition of one or more other elements unless otherwise specified. Furthermore, the term " . . . unit" or " . . . module" described herein refers to a unit for processing at least one function or operation, and may be implemented as hardware, software, or a combination thereof.

It is to be understood that the detailed description, which will be disclosed along with the accompanying drawings, is intended to describe the exemplary embodiments of the present invention, and is not intended to describe a unique embodiment with which the present invention can be carried out.

The standard documents, OMA-TS-REST_NetAPI_NavSe-V1.0 and the draft of OMA-ER-NavSe-V1.0, which are accessible from the URL http://member.openmobilealliance.org/ftp/Public_documents/LOC/Permanent_documents/ at the time of filing this application, are hereby incorporated by reference in their entirety into the present disclosure.

Hereinafter, the terms used herein are briefly defined.

In this disclosure, an application is an implementation of a set of well-defined but unstandardized functions for performing work on behalf of a user. The application may include software and/or hardware components and associated user interfaces.

In the technical field to which the present invention pertains, a server is an entity for providing resources to clients in response to requests. In the technical field to which the present invention pertains, a client is a device, a user agent, or some other entity that acts as a receiver of a service.

In this disclosure, a NavSe application is an entity that is responsible for interacting with a server in order to obtain route information and both real-time and predicted traffic information. Therefore, the NavSe application is installed in a mobile device, such as a smartphone, a mobile terminal, a navigation device, or the like. In this disclosure, the terms 'NavSe application', 'device', and 'NavSe client' may be used interchangeably with each other. From this aspect, the NavSe application is a kind of client.

A NavSe server is an entity that is responsible for providing route information and real-time and predicted traffic information to NavSe applications. In this specification, the NavSe server may be simply referred to as a 'server'.

A location Uniform Resource Identifier (URI) is a URI through which the current position of a device can be obtained from a particular location server using a location acquisition protocol.

A Navigation Device (ND) is an entity for assisting a driver by showing a correct route for reaching a final destination using a Global Navigation Satellite System (GNSS) service. This entity may process real-time and predicted traffic information and dynamically estimate the optimal route depending on user preferences.

A lightweight ND is a navigation device that has no function to calculate a route but receives a calculated route from a server by requesting the same therefrom. The lightweight ND accesses the server for route estimation functionalities and for retrieving road shape representations when a local map database is unavailable.

A smart ND is a navigation device that is capable of calculating a route or routes using a road network database available on the device itself.

A Point Of Interest (POI) describes information about locations, such as the name, the category, the unique identifier, or the civic address.

In this disclosure, a segment is a unit into which a road is divided. In a street, a road running between intersections is called a 'segment'. In a highway, a road is divided into segments according to a policy for the highway. Traffic congestion or a passing time may be determined on a segment basis. In this disclosure, the terms 'segment' and 'road section' may be used interchangeably with each other.

A segment sequence is a set of one or more consecutive segments. According to need, a segment sequence may comprise only a single segment. For example, when a segment sequence is configured with two or more segments, the end point of the first segment is the same as the start point of the second segment.

A polyline is a continuous line used in computer graphics, which consists of one or more line segments and is defined by specifying the endpoints of each segment.

Route information is information about a set of segments from a defined origin to a defined destination and coordinates of supplementary data.

Traffic information is information configured with traffic events and network performance parameters related to an area or a route. Also, the traffic information may include current traffic information or upcoming, that is, future, traffic information.

A traffic event is information about events related to an area or route imposed or planned by a road network operator (i.e., road repairs causing road closure) or events that occur outside the control of the road network operator (i.e., accidents).

A network performance parameter or performance parameter is information about the performance (i.e., the speed, the delay, and the travel time) of road segments present in a given area or route.

Route information in a full format is a kind of route information including information about all segments from an origin to a destination. Unless otherwise specified, route information indicates a full route.

Route information in a summarized format is a kind of route information including information about segments that are selected for the summary of information from among all segments of a route from an origin to a destination.

Unusable route information is information about blocked or destroyed routes in an area in which a disaster, such as a fire, earthquake, flood or the like, has occurred.

A navigation device is a device that is capable of showing a route. The navigation device includes all kinds of electronic devices that are portable or attachable to a portable object, such as a smartphone, a mobile phone, a mobile device, a laptop, a tablet PC, a smart pad, and the like. Hereinafter, the navigation device may be abbreviated to ND.

In this disclosure, shared route information is route information provided to two NavSe applications located at opposite ends of a route. The respective routes provided to the two NavSe applications are in opposite directions so as to be directed to each other.

FIG. 1 is a view that shows a scenario for deploying a navigation system to which methods according to the present invention may be applied.

As shown in FIG. 1, a navigation system includes a NavSe server, a navigation device carried by a person in danger who needs to move to a safe place in an emergency situation (which may be referred to as a 'victim's device'), and another navigation device carried by a rescuer who will rescue the person in danger, such as a rescue worker (which may be referred to as a 'rescuer's device'). Here, the navigation device carried by the person in danger and the navigation device carried by the rescuer may access the NavSe server via a wireless network.

The navigation devices may be connected with an IP network via a mobile communication network or a Wi-Fi network, and a NavSe application for providing a navigation service to a user (a rescuer or a person who needs to be rescued) may be installed therein. The NavSe application may communicate with the NavSe server using a RESTful protocol and receive route information and/or traffic information from the NavSe server, thereby providing guidance for a route to the user thereof. Hereinafter, for the convenience of description, the NavSe application installed in the navigation device carried by a person who needs to be rescued is referred to as 'NavSe application 1', and the NavSe application installed in the navigation device carried by a rescuer is referred to as 'NavSe application 2'.

The present invention considers the following navigation service scenario, which is useful in an emergency situation.

In the emergency situation, the person who needs to be rescued (i.e., the person who asks for help) calls any national public safety agency (for example, a fire station, a police station or the like) in order to request an emergency rescue service. After receiving the call, a rescuer (i.e., a rescue worker) requests the NavSe server to provide information about a route to reach the caller. The NavSe server provides the requested route information to the rescuer, and also provides information about a route to reach the rescuer to the person who asked for help. That is, the NavSe server provides shared route information to both the rescuer and the person who asked for help. Using the shared route information, the person who asked for help may move to the rescuer in order to quickly receive a rescue service.

The NavSe server calculates route information depending on the trip parameters defined in the NavSe application 1 and provides the same to the NavSe application 1. The destination of the route for the NavSe application 1 is the position of the user of the NavSe application 2. Then, the NavSe server calculates route information for the NavSe application 2, the destination of which is the position of the user of the NavSe application 1, and provides the route information to the NavSe application 2.

In the event of traffic congestion in the selected route, the NavSe server may provide an alternative route to the NavSe application 1 and the NavSe application 2.

The user of the NavSe application 1 or the user of the NavSe application 2 may divert or deviate from the route by chance or according to need. In this case, the NavSe application 1 or the NavSe application 2 requests information about a new route and traffic information related thereto from the NavSe server.

When the NavSe application 1 subscribes to a notification service in order to receive real-time information, the NavSe application 2 automatically subscribes to the notification service without interaction with the user thereof.

Figure 2:
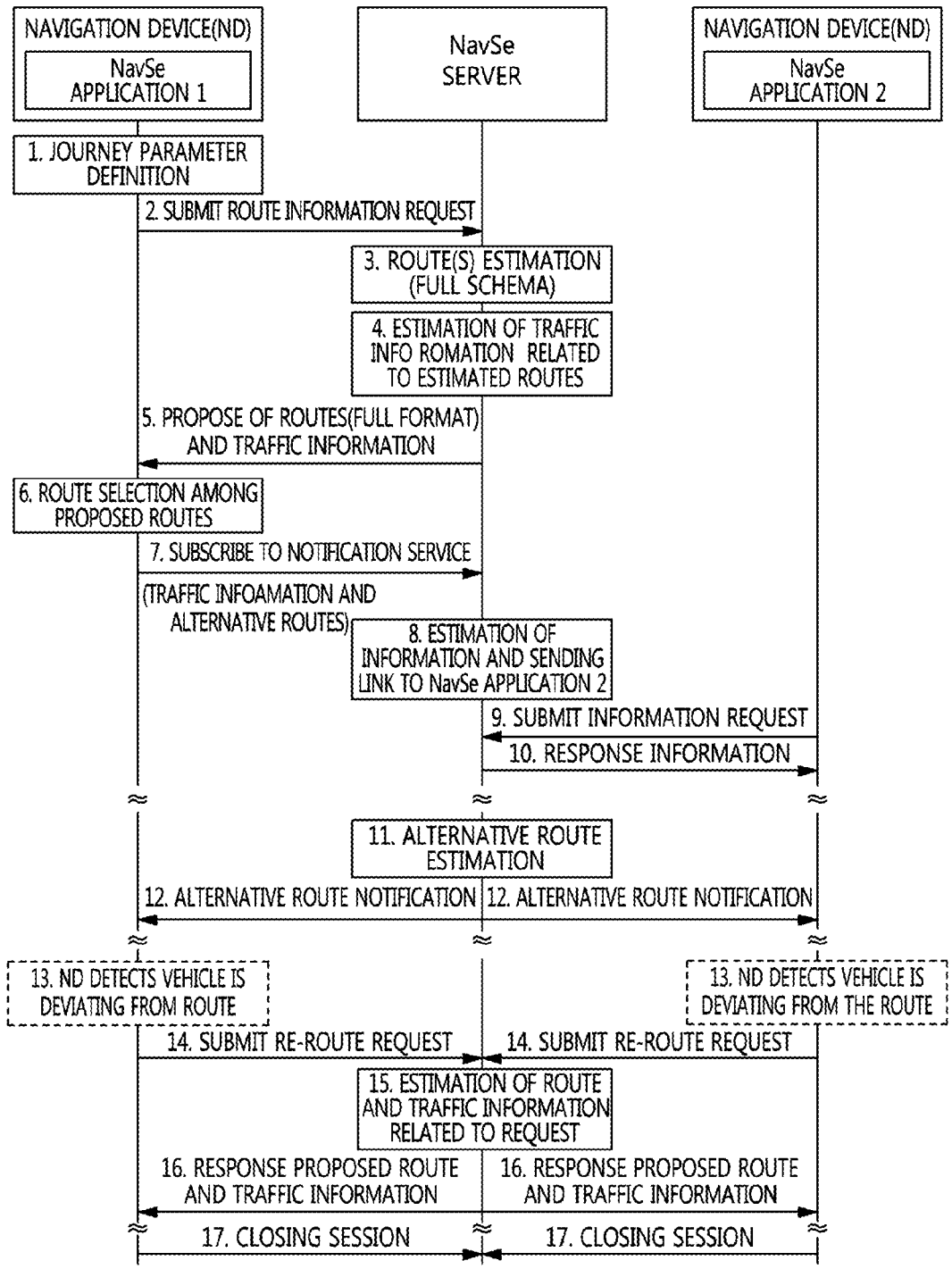
FIG. 2 is a flowchart that shows a scenario in which an interactive navigation service is provided in an emergency situation according to an embodiment of the present invention.

FIG. 2 is a flowchart that shows a scenario in which an interactive navigation service is provided in an emergency situation according to an embodiment of the present invention.

(STEP 1) User 1 (the person who asks for help) sets journey parameters in order to request shared route information related to user 2 (a rescuer). Here, the destination may be set to the unique identifier (for example, a mobile phone number or the like) of the user 2 (rescuer).

(STEP 2) The NavSe application 1 delivers the journey parameters to the NavSe server in order to access information about a route and traffic information related thereto.

(STEP 3) The NavSe server acquires information about the position of the rescuer using an external entity and the like. The NavSe server calculates (or estimates) one or more routes matching the journey parameters using the acquired position information.

(STEP 4) The NavSe server creates traffic information (i.e., traffic events and network performance parameters) related to the calculated routes.

(STEP 5) The NavSe server provides the calculated routes and the traffic information related thereto to the NavSe application 1.

(STEP 6) The user 1 (the person who asks for help) selects a desired route.

(STEP 7) The NavSe application 1 subscribes to a notification service for receiving real-time information, for example, information about traffic conditions in the selected route, an alternative route proposed when traffic in the selected route is bad or when the position of the user of the NavSe application 1 deviates from the route, and the like. In this step, the NavSe application may provide a location URI, which is used in an external location application for tracking procedures, to the NavSe server with the user's consent.

(STEP 8) The NavSe server newly creates information for providing a navigation service to the user 2 (rescuer), for example, route information and traffic information related thereto. Here, the origin of a journey parameter becomes the position of the user 2 (rescuer), and the destination thereof becomes the position of the user 1 (the person who asks for help). The direction of the route to be provided is opposite the direction of the route selected by the user 1 (person who asks for help) at STEP 6. The NavSe server delivers information (a link) through which the created information is accessible to the user 2 using an external entity, for example, MMS, SMS, OMP Push, or the like.

(STEP 9) The NavSe application 2 requests route information and traffic information related thereto from the NavSe server.

(STEP 10) The NavSe server provides the route information and the traffic information related thereto to the NavSe application 2. Here, the NavSe application 2 automatically subscribes to a notification service without interaction with the user thereof.

(STEP 11) In the event of poor traffic conditions in the provided route while the navigation service is being provided, the NavSe server calculates an alternative route.

(STEP 12) The NavSe server provides the alternative route to the NavSe application 1 and the NavSe application 2.

(STEP 13) When deviation of the user 1 (person who asks for help) or the user 2 (rescuer) from the route in use is detected while the navigation service is being provided, (STEP 14) the NavSe application 1 or the NavSe application 2 automatically sends a request for rerouting itself to the NavSe server in order to update the route so as to match the current position thereof.

(STEP 15) The NavSe server calculates route information and traffic information again based on the current positions of the user 1 (person who asks for help) and the user 2 (rescuer).

(STEP 16) The NavSe server provides the calculated route information and traffic information to the NavSe application 1 and the NavSe application 2. The NavSe server updates subscription settings for a notification service for the NavSe application 1 and the NavSe application 2.

(STEP 17) The NavSe application 1 and the NavSe application 2 terminate a session, for example, after driving is completed.

Hereinafter, a description of the functions and operations of the NavSe server for implementing the exemplary scenario, which was described with reference to FIG. 2, will be made. The Navigation Service Framework (NavSe) standard to be described below is based on the draft of OMA-TS-REST_NetAPI_NavSe-V1.0, which was disclosed at 2017.09.26.

The NavSe standard (OMA-TS-REST_NetAPI_NavSe-V1.0) specifies the definition of resources, HTTP verbs applicable to each of the resources, and data structures of the respective resources in order to support the following operations:

Requesting and providing a set of routes based on the journey parameters defined by a user
  Requesting and providing traffic information related to the route and area defined by a navigation device
  Requesting and providing route information for public safety usage
  Requesting and providing unavailable route information related to an emergency area
  Managing a subscription to a notification service for receiving real-time information and an update on an alternative route proposal That is, the draft of the NavSe standard does not include specifications for supporting the interactive navigation service described with reference to FIG. 2.

According to the present invention, the resources specified in the draft of the NavSe standard are used to support an interactive navigation service, rather than adding new resources. Therefore, the resources for supporting the interactive navigation service are the same as the resources specified in the draft of the NavSe standard. However, the present invention proposes addition and modification of data structures included in the resources specified in the draft of the NavSe standard, elements (namely, parameters) forming these data structures, and the types thereof. First, the hierarchical structure of the resources defined in the draft of the NavSe standard, which is used in the present invention, will be described with reference to FIG. 3.

Figure 3A:
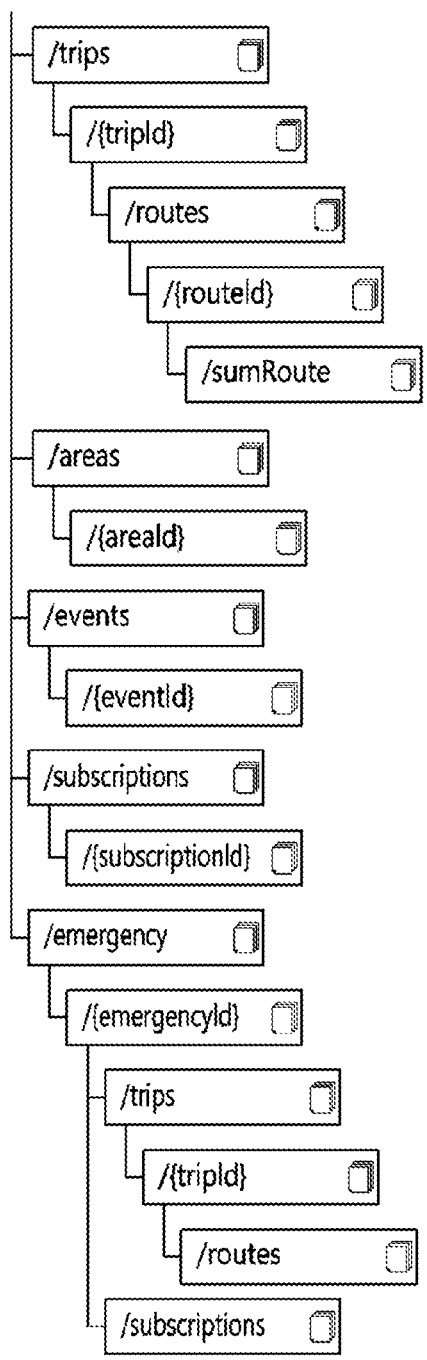
FIG. 3A and FIG. 3B show a diagram that represent the hierarchical structure of resource defined in the draft of a NavSe standard.
Figure 3B:
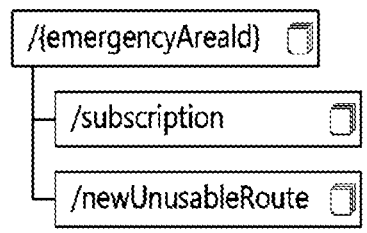

FIG. 3A and FIG. 3B show a diagram that shows the hierarchical structure of resources defined in the draft of the NavSe standard.

When a NavSe application requests a route or when traffic information for a route is created, the NavSe server creates resources, which form a hierarchical structure as shown in FIG. 3A, and provides a service in response to each request made by the NavSe application. That is, the NavSe resource structure shown in FIG. 3A is newly created whenever a request is made. However, because information about unavailable routes related to an emergency area is provided in common to multiple users, the NavSe standard specifies creation of a single resource tree for managing an emergency area, as shown in FIG. 3B. That is, using the single resource tree, the NavSe server identically provides the service to multiple users who are located in the emergency area or who are passing through the emergency area.

In the following Tables 1 to 9, the resources illustrated in FIGS. 3A and 3B are categorized depending on the purposes thereof, and the URL of each resource, the data structure thereof, and HTTP verbs applicable thereto are described.

<Resources for Trip Management>

TABLE 1

| Resource | URL<br>Base URL:<br>http://{serverRoot}/<br>navse/{apiVersion}/<br>{appId} | Data Structures | HTTP verbs | | | |
|---|---|---|---|---|---|---|
| | | | GET | PUT | POST | DELETE |
| Trips created by the application | /trips | TripList (used for GET)<br>Trip (used for POST)<br>common: Resource Reference (optional alternative for POST response) | Read list of all trips created by the application. | No | Create new trip | No |
| Individual trip description | /trips/{tripId} | Trip | Read trip settings, preferences and link to the related routes | Modify parameters that describe the trip | No | Delete trip |

<Resources for Management of Routes Defined for a Trip>

TABLE 2

| Resource | URL<br>Base URL:<br>http://{serverRoot}/<br>navse/{apiVersion}/<br>{appId} | Data Structures | HTTP verbs | | | |
|---|---|---|---|---|---|---|
| | | | GET | PUT | POST | DELETE |
| Routes related to a trip | /trips/{tripId}/routes | Route<br>common: Resource Reference (optional alternative for POST response) | No<br>Note: Routes Ids are available in Trip resource | No | Add a new route to the trip | No |
| Individual route description in full format | /trips/{tripId}/routes/{routeId} | Route | Read data about specified route | Modify a route previously uploaded | No | Delete route |
| Individual route description in summarized format | /trips/{tripId}/routes/{routeId}/sumRoutes | Route | Read data about specified route | No | No | No |

<Resources for Area Management>

TABLE 3

| Resource | URL<br>Base URL:<br>http://{serverRoot}/<br>navse/{apiVersion}/<br>{appId} | Data Structures | HTTP verbs | | | |
|---|---|---|---|---|---|---|
| | | | GET | PUT | POST | DELETE |
| Areas created by the application for traffic information | /areas | AreaList (used for GET)<br>Area (used for POST)<br>common: Resource Reference (optional alternative for POST response) | Read all areas created by the application | No | Create a new area | No |
| Individual area for traffic information | /areas/{areaId} | Area | Read area information | No | No | Delete an area |

<Resources for Subscriptions Management for Updates on a Trip, a Route, an Event, and an Area>

TABLE 4

| Resource | URL<br>Base URL:<br>http://{serverRoot}/<br>navse/{apiVersion}/<br>{appId} | Data Structures | HTTP verbs | | | |
|---|---|---|---|---|---|---|
| | | | GET | PUT | POST | DELETE |
| Subscriptions created by the application | /subscriptions | SubscriptionList (used for GET)<br>Subscription (used for POST)<br>common: Resource Reference (optional alternative for POST response) | Read list of all subscriptions created by the application | No | Create new subscription | No |
| Individual subscription settings | /subscriptions/{subscriptionId} | Subscription | Read subscribed resources | Update subscription settings | No | Delete subscription |

<Resource for Callback Notifications for Updates on a Trip, a Route, an Event, and an Area>

TABLE 5

| Resource | URL<br><specified by the client> | Data Structures | HTTP verbs | | | |
|---|---|---|---|---|---|---|
| | | | GET | PUT | POST | DELETE |
| Client notification about areas and trips updates | <specified by the client when a subscription is created> | Notification | No | No | Notifies client about updates in subscribed resources (areas and trips with related routes and events). | No |

<Resources for Event Management>

TABLE 6

| Resource | URL<br>Base URL:<br>http://{serverRoot}/<br>navse/{apiVersion}/<br>{appId} | Data Structures | HTTP methods | | | |
|---|---|---|---|---|---|---|
| | | | GET | PUT | POST | DELETE |
| Events related to the application | /events | EventList | Read all available events | No | No | No |
| Individual event information | /events/{eventId} | Event | Read a single event | No | No | No |

<Resources for Emergency Trip Management>

TABLE 7

| Resource | URL<br>Base URL:<br>http://{serverRoot}/<br>navse/{apiVersion}/<br>{appId} | Data Structures | HTTP verbs | | | |
|---|---|---|---|---|---|---|
| | | | GET | PUT | POST | DELETE |
| Emergency Trip created by the application | /emergency/<br>(emergencyid)/<br>trips | TripList (used for GET)<br>Trip (used for POST)<br>common: Resource Reference (optional alternative for POST response) | Read list of all trips created by the application. | No | Create new trip | No |
| Individual trip description | /emergency/<br>(emergencyid)/<br>trips/{tripId} | Trip | Read trip settings, preferences and link to the related routes | Modify parameters that describe the trip | No | Delete trip |

<Resource for Management of Routes Defined for an Emergency Trip>

TABLE 8

| Resource | URL<br>Base URL:<br>http://{serverRoot}/<br>navse/{apiVersion}/<br>{appId} | Data Structures | HTTP verbs | | | |
|---|---|---|---|---|---|---|
| | | | GET | PUT | POST | DELETE |
| Routes related to a trip | /emergency/<br>(emergencyid)/<br>trips/{tripId}/<br>routes | Route<br>common: Resource Reference (optional alternative for POST response) | Read data about specified route | No | No | No |

<Resources for Emergency Area Management>

TABLE 9

| Resource | URL<br><specified by the server> | Data Structures | HTTP verbs | | | |
|---|---|---|---|---|---|---|
| | | | GET | PUT | POST | DELETE |
| Unusable route related | <specified by the server> | EmergencyArea (used for GET)<br>common: Resource | Read unusable routes | No | No | No |

TABLE 9-continued

| Resource | URL <specified by the server> | Data Structures | HTTP verbs | | | |
|---|---|---|---|---|---|---|
| | | | GET | PUT | POST | DELETE |
| to an emergency area | | Reference (optional alternative for POST response) | | | | |
| Subscription created by the application | <specified by the server>/ subscription | Subscription | Read subscribed resource | No | Create new subscription | Delete subscription |
| Updated unusable route | <specified by the server>/ newUnusableRoute | NewUnusableRoute | No | No | Create updated unusable segment | No |

The draft of the NavSe standard also specifies elements that form each of the data structures of the resources arranged in Tables 1 to 9. The present invention proposes to change some of the data structures specified in the draft of the NavSe standard and elements forming each of these data structures and to add some elements. Excluding the data structures to be described below, the data structures specified in the draft of the NavSe standard and elements forming each of these data structures are used without change. It should be noted that items newly proposed by the present invention are highlighted in bold type in the following Tables 10 to 13. Also, an element included in each data structure may be referred to as a "parameter" or a "field".

<Data Structure: Trip>

Trip parameters are provided in order to enable a NavSe application to request route information and traffic information from a NavSe server.

TABLE 10

| Element | Type | Optional | Description |
|---|---|---|---|
| originWGS84 | Location_Point | Choice | This field represents the origin of the trip for which route information and related traffic information are requested from the server. Location_Point structure is defined in tpeg-locML [TTI LOC]. One element among originWGS84 or originAddress MUST be specified when Trip resource is created. This element is mandatary when the Trip resource is read by the client. This field can be used to indicate the assumed current position of the client, enabling route information updating procedure on the server. In case that unusableRoute field is set to True and the value of destinationWGS84 is identical with this parameter, it indicates that the NavSe application requests the unusable route information related to an emergency area including the position in this parameter. In case that unusableRoute field is set to True and the value of destinationWGS84 is not identical with this parameter, it indicates that the NavSe application requests the unusable route information in an emergency area along the route which the NavSe application drives. |
| originAddress | Civic_Address | Choice | This field represents the origin of the Trip and it is present when the origin is expressed according to IETF Civic Address [RFC5139]. One element among originWGS84 or originAddress MUST be specified when Trip resource is created. In case that unusableRoute field is set to True and the value of destinationAddress is identical with this parameter, it indicates that the NavSe application requests the unusable route information related to an emergency area including the position in this parameter. In case that unusableRoute field is set to True and the value of destinationAddress is not identical with this parameter, it indicates that the NavSe application requests the unusable route information in an emergency area along the route which the NavSe application drives. |
| destinationWGS84 | Location_Point | Choice | This field represents the destination of the trip for which route information and related traffic information are requested from the server. |

TABLE 10-continued

| Element | Type | Optional | Description |
|---|---|---|---|
| | | | Location Point structure is defined in tpeg-locML [TTI LOC]. In case that Trip resource is created for an emergency, this field may not be specified, otherwise one element among destinationWGS84 or destinationAddress MUST be specified when Trip resource is created. In case that sharedRoute field is present and set to True when Trip resource is created, this field may be omitted. This structure is mandatory when the Trip resource is read by the client. In case that unusableRoute field is set to True and the value of originWGS84 is identical with this parameter, it indicates that the NavSe application requests the unusable route information related to an emergency area including the position in this parameter. In case that unusableRoute field is set to True and the value of originWGS84 is not identical with this parameter, it indicates that the NavSe application requests the unusable route information in an emergency area along the route which the NavSe application drives. |
| destinationAddress | Civic_Address | Choice | This field represents the destination of the trip and it is present when the destination is expressed according to IETF Civic Address [RFC5139]. In case that Trip resource is created for an emergency, this field may not be specified, otherwise one element among destinationWGS84 or destinationAddress MUST be specified when Trip resource is created. In case that sharedRoute field is present and set to True when Trip resource is created, this field may be omitted. This structure may be provided by the server in case the user define a destination using destinationWGS84 structures. In case that unusableRoute field is set to True and the value of originAddress is identical with this parameter, it indicates that the NavSe application requests the unusable route information related to an emergency area including the position in this parameter. In case that unusableRoute field is set to True and the value of originAddress is not identical with this parameter, it indicates that the NavSe application requests the unusable route information in an emergency area along the route which the NavSe application drives. |
| destinationId | xsd:string | Choice | destinationId represents the target user Id. The target user Id is used for retrieving the target user's position and the position is used as a destination of the trip. In case that sharedRoute field is present and set to True when Trip resource is created, this field SHALL be present. |
| destinationIdType | DestinationIdType List | Yes | Indicate which type of the target user Id is used in the destinationId element. If destinationId is present and set to True, destinationIdType MUST be present. |
| waypoints | Location_Point [0 . . . unbounded] | Yes | The waypoints may be used to provide additional information about the trip. Location_Point structure is defined in tpeg-locML [TTI LOC]. |
| startingTime | xsd:dateTime | Yes | Starting time of the planned trip. If not present, current time is used. |
| endingTime | xsd:dateTime | Yes | Ending time of the planned trip, provided by the Server based on the route estimation |
| tollRoad | xsd:boolean | Yes | This field carries the information whether toll roads MAY be included in route estimation If true or not present, toll road are allowed. |
| vehicleType | xsd:string | Yes | This field describes the type of vehicle for which route information is requested. This field SHALL be encoded according to the list of values defined in table RTM01 provided in [TTI RTM] |
| calculateRoute | TripQueryType [1 . . . 2] | Yes | If this parameter is present and set to Route, the server MUST propose, for the defined Trip, a set of routes with related traffic events and performance parameters, and/or alternative routes in case of congestion. |

TABLE 10-continued

| Element | Type | Optional | Description |
|---|---|---|---|
| requestedEvents Categories | xsd:string [0 . . . unbounded] | Yes | If this parameter is set to NoAction or absent, the route will be estimated by the ND. Categories of traffic information, related to the defined Trip, requested by the application. This field shall be encoded according to the list of values defined in the rtm00 table available in [TTI RTM]. If this field is not present, the server MUST provide traffic information for all defined categories (including network performance parameters). |
| unusableRoute | xsd:boolean | Yes | If this parameter is present and set to True, it represents that the unusable route information related to the emergency area is requested by the NavSe application. If this parameter is specified by the NavSe server, it represents that there is unusable route information of the emergency area related to the Trip resource. And area information of the emergency area is provided by the emergencyArea parameter. |
| emergencyArea | Location Container [0 . . . unbounded] | Yes | This parameter represent area information of the emergency area. This parameter MUST be presented when the unusableRoute parameter is specified by the NavSe server. |
| sharedRoute | xsd:boolean | Yes | If this parameter is present and set to True, it represents that the shared route information is requested by the NavSe application. In case that this field is present and set to True when Trip resource is created, destinationId SHALL be present. |
| link | common:Link [0 . . . unbounded] | Yes | Link to reference route resource. Attribute "rel" must be set to "Route" or "UnusableRoute". |
| resourceURL | xsd:anyURI | Yes | Self referring URL. The resourceURL SHALL NOT be included in POST requests by the client, but MUST be included in POST requests representing notifications by the server to the client, when a complete representation of the resource is embedded in the notification. The resourceURL MUST be also included in responses to any HTTP method that returns an entity body, and in PUT requests. |

As shown in Table 10, the present invention proposes to add a destinationId parameter and a sharedRoute parameter in the data structure of a Trip resource. When a Trip resource is created, the Trip resource must include any one of a destinationWGS84 parameter, a destinationAddress parameter, and a destinationID parameter, and a Trip resource for requesting shared route information must include a destinationID parameter, in which case the other parameters, that is, destinationWGS84 and destinationAddress parameters, may be omitted.

The NavSe application 1 creates a Trip resource in the NavSe server in order to request an interactive navigation service with the NavSe application 2. Here, the sharedRoute parameter in the Trip resource is set to 'True' so as to announce that the NavSe application 1 requests a shared route, and the destinationId parameter therein is set to a target user ID (that is, the ID of the user related to the NavSe application 2). The target user ID is used to retrieve the position of the target user, and the position of the target user is used as the destination of the trip. The target user ID may be of an identifier type such as MSISDN, MDN, IMSI, NAI, IPv4, IPv6, or the like.

In the typical scenario in which a NavSe application is provided with route information and traffic information from a NavSe server, each NavSe application must create a Trip resource in the NavSe server. However, the interactive navigation service proposed by the present invention is triggered by a request made by the NavSe application 1 and provides a shared route to both the NavSe application 1 and the NavSe application 2. Therefore, when the NavSe application 1 creates a Trip resource in which a sharedRoute parameter is set to 'True', the NavSe server automatically creates a Trip resource for the NavSe application 2 in order to provide route information and traffic information thereto. Here, the automatically created Trip resource is almost identical to the Trip resource created by the NavSe application 1, but the origin (i.e., originWGS84) of the Trip resource created by the NavSe application 1 is set as the destination (i.e., destinationWGS84) of the Trip resource for the NavSe application 2, and the destination (i.e., destinationWGS84) of the Trip resource created by the NavSe application 1 is set as the origin (i.e., originWGS84) of the Trip resource for the NavSe application 2.

<Data Structure: Route>

The data structure of a Route resource includes route information that the NavSe server is to provide to a NavSe application.

TABLE 11

| Element | Type | Optional | Description |
| --- | --- | --- | --- |
| travellingTime | xsd:float | Yes | Total travelling time (in minutes) for the route. |
| distance | xsd:float | Yes | Total distance (in Km) of the route. |
| origin | Location_Point | No | This field represents the origin of the route expressed in WGS84 coordinates. Location_Point structure is defined in tpeg-locML [TTI LOC]. |
| partialRouteInformation | xsd:boolean | Yes | If set to true, the Route is described with partial information: only changed segments sequence is provided with respect to a reference route. The reference route is defined in link field of this structure.<br>The partial route encoding schema is described in Appendix D. The partial encoding schema MAY be used for full routes resources.<br>If this field is absent or set to false, the route information is complete. |
| firstSegment | xsd:integer<br>[0 . . . unbounded] | Yes | This field represents one or more index of the first segment in the reference route segments sequence to be replaced by partial route segments sequence.<br>In a partial route, a sequence of deviations MAY be provided with respect to the reference route: for each deviation it is provided the index of the first segment in the reference route that has to be replaced by partial route segments sequence.<br>This field is present only in case of partial route encoding schema (partialRouteInformation set to True) (see Appendix D). |
| lastSegment | xsd:integer<br>[0 . . . unbounded] | Yes | This field represents one or more index of the last segment in the reference route segments sequence to be replaced by the segments sequence of partial route. Only used for the partial route case (see Appendix D).<br>In a partial route, a sequence of deviations MAY be provided with respect to the reference route: for each deviation it is provided the index of the last segment in the reference route that has to be replaced by partial route segments sequence.<br>This field is present only in case of partial route encoding schema (partialRouteInformation set to True and for more detail see Appendix D). |
| numSegments | xsd:integer<br>[0 . . . unbounded] | Yes | This field represents the number of segments that constitutes each single deviation of the partial route. Only used for the partial route information case (see Appendix D).<br>In a partial route, a sequence of deviations MAY be provided with respect to the reference route: for each single deviation the number of describing segments is provided. The sum of the number of segment of each deviation should be equal to the number of segments provided in the partial route.<br>This field is present only in case of partial route encoding schema (partialRouteInformation set to True and for more detail see Appendix D). |
| segment | Segment<br>[1 . . . unbounded] | No | Sequence of road segments that forms the route.<br>In case of in partial route description, only the segment sequences describing the deviations are provided (see Appendix D).<br>In case of partial route with multiple deviations, each single deviation is identified by the length of each sequence reported in numSegment fields of this structure. |
| trafficEvents | CategorizedEventListReference<br>[0 . . . unbounded] | Yes | List of traffic events related to the route, as defined in tpeg-rtmML [TTI RTM]. The events are grouped by the categories, defined in RTM00 table provided in [TTI RTM]. |
| positionUpdate | xsd:boolean | Yes | If this field is present and set to True, the NavSe application is requested to upload its current position on the NavSe server whenever the navigation device enters the new segment. |
| link | common:Link<br>[0 . . . unbounded] | Yes | Link to reference route resource. There are two different kinds of reference route resources.<br>1) Reference to the route for which it is proposed as alternative. Attribute "rel" must be set to "Route".<br>2) Reference to the route for which the partial route information is referred. Attribute "rel" must be set to "ReferenceRoute". |
| resourceURL | xsd:anyURI | Yes | Self referring URL. The resourceURL SHALL NOT be included in POST requests by the client, |

TABLE 11-continued

| Element | Type | Optional | Description |
|---|---|---|---|
| | | | but MUST be included in POST requests representing notifications by the server to the client, when a complete representation of the resource is embedded in the notification. The resourceURL MUST be also included in responses to any HTTP method that returns an entity body, and in PUT requests. |

As shown in Table 11, the present invention proposes to add a positionUpdate parameter in the data structure of a Route resource.

<Data Structure: Subscription>

For the data structure of a Subscription resource, the present invention proposes the following:

TABLE 12

| Element | Type | Optional | Description |
|---|---|---|---|
| callbackReference | common:CallbackReference | No | Client's Notification endpoint and parameters. |
| link | common:Link [1 . . . unbounded] | No | References to resources subscribed by the application. Attribute "rel" indicates the type of resource subscribed. It may assume the following values:<br>* "Trip": in order to get notified about:<br>o new traffic events and performance parameter related to the set of routes defined for the trip<br>o new alternative route proposals<br>* "Area": in order to be notified of new traffic events and performance parameters updates<br>* "UnusableRoute": in order to be notified of updated unusable route information<br>* "SharedRoute": in order to be notified of updated destination information with remaining time and distance<br>Attribute "href" specifies the URL of subscribed resource. Subscribed resource's type must be the same of that specified in "rel" attribute.<br>Note: notified information for an existing route are:<br>a) new traffic events provided with links included in the route resource itself;<br>b) performance parameters available in updated performanceParameter filed of segment structures. |
| trackingProc | xsd:boolean | Yes | If present and set to True, the application communicate to the server user's availability to provide position information through an external location application. |
| deviceLocationURI | xsd:anyURI | Yes | This parameter is used by the server for accessing Navigation Device position information. |
| resourceURL | xsd:anyURI | Yes | Self referring URL. The resourceURL SHALL NOT be included in POST requests by the client, but MUST be included in POST requests representing notifications by the server to the client, when a complete representation of the resource is embedded in the notification. The resourceURL MUST be also included in responses to any HTTP method that returns an entity body, and in PUT requests. |

The NavSe server provides a NavSe application with route information using a Route resource. A route includes one or more segments. When it provides a route, the NavSe server adds a positionUpdate parameter in the data structure of a Route resource and sets the parameter to 'True', thereby instructing the NavSe application to provide the current position whenever the user of the NavSe application enters each segment in the route. The NavSe application provides the current position to the NavSe server when the user of the NavSe application enters a new segment while he or she is moving along the route provided by the NavSe server.

As shown in Table 12, a Subscription resource includes a link element, and a "rel" attribute of the link element is a set of strings for representing a relationship between the current resource and an external resource (that is, the type of the resource to subscribe to). The present invention adds a "SharedRoute" string in the string set of "rel", thereby enabling the notification of the update on the parameters arranged in Table 14.

<Data Structure: Notification>

For the data structure of a Notification resource, the present invention proposes the following:

TABLE 13

| Element | Type | Optional | Description |
|---|---|---|---|
| link | common:Link [1 . . . unbounded] | No | Link to updated resources. Attribute "rel" attribute indicates type of resource updated and may assume "Trip", "Route", "Event", "Area", and "DisableRoute" values. |
| expectedInfoUpdate | Xsd:string | Yes | The value of this parameter is an ID of expectedUnusableRoute(expectedRouteId) or expectedUnusableArea(expectedAreaId) provided in EmergencyArea. This parameter represents that the route included in expectedUnusableRoute or expectedUnusableArea indicated by this field becomes the unusable route. |
| updatedShared RouteInfo | SharedRouteInfo | Yes | This field represents the updated information related with the shared route information used. This field includes the updated target user's position as a destination, remaining time and distance information. |

As shown in Table 13, the present invention proposes to add an updateSharedRouteInfo parameter in the data structure of a Notification resource. The updateSharedRouteInfo parameter represents updated information related to the shared route information that is being used. This parameter includes the current position of a target user (that is, rescuer) corresponding to the destination, remaining time, and the distance to the target user, as shown in Table 14.

<SharedRouteInfo Parameter>

A SharedRouteInfo parameter, newly proposed by the present invention, is configured with three subordinate parameters, as shown below.

TABLE 14

| Element | Type | Optional | Description |
|---|---|---|---|
| position | Location_Point | No | This field represents the current position of the target user as a destination. Location_Point structure is defined in tpeg-locML [TTI LOC]. |
| remainingTime | xsd:float | No | This field represents the remaining time (expressed in minutes) between two NavSe applications along the current route. |
| remainingDistance | xsd:float | No | This field represents the remaining distance (expressed in km) between two NavSe application along the current route. |

<DestinationIdTypeList Parameter>

The enumeration of DestinationIdTypeList, which is newly proposed by the present invention, is as follows. Table 15 is enumeration of target user ID types, and the target user ID type is used to represent the type of the used identifier.

TABLE 15

| Enumeration | Description |
|---|---|
| MSISDN | The type of the 3$^{rd}$ party ID is MSISDN |
| MDN | The type of the 3$^{rd}$ party ID is MDN |
| IMSI | The type of the 3$^{rd}$ party ID is IMSI |
| NAI | The type of the 3$^{rd}$ party ID is NAI |
| IPv4 | The type of the 3$^{rd}$ party ID is IPv4 |
| IPv6 | The type of the 3$^{rd}$ party ID is IPv6 |

<Value of "rel" Attribute of Link>

The value of the "rel" attribute of a link element represents the type of the resource that the link points to. That is, the "rel" attribute of a link element is a free string that is set based on the server implementation in order to indicate a relationship between the current resource and an external resource. The available string is as follows, and this list may be extended.

Route
ReferenceRoute
Event
Area
DisableRoute
SharedRoute

Hereinafter, a description of the typical scenario of a NavSe application in which a navigation device requests shared route information from a NavSe server will be made.

When user 1 sets journey parameters, the ID of user 2 is used as the destination, and a sharedRoute parameter, which is an indicator for indicating that shared route information is requested, is set to 'True'. When it receives the request, the NavSe server acquires information about the position of the user 2 using the ID of the user 2 through an external entity over a network, and uses the acquired position information as the destination when a Trip resource is created.

The NavSe server creates information about a route for reaching the user 2 and traffic information related to the route, and provides the same to the application of the user 1 (that is, application 1).

Here, the provided route information includes an indicator for instructing the application 1 to upload current position information to the NavSe server when the navigation device having the application 1 enters a new segment.

When the application 1 subscribes to a notification service, the NavSe server automatically creates trip information, route information, and related traffic information for the user 2 without interaction with application 2, which is the application of the user 2. The route information for the application 2 is in the direction opposite the direction of the route information for the application 1, that is, the route information for the application 2 is for reaching the user of the application 1. After a Trip resource is created, the NavSe server transmits the created Trip resource to the user 2 using OMA push, MMS, or the like. After the application 2 receives the route and traffic information, the application 2 automatically subscribes to the notification service without interaction with the user 2.

When the application 1 subscribes to a notification service, the NavSe server creates trip information, route information, and related traffic information for the user 2 without interaction with the application of the user 2.

When the application 1 subscribes to a notification service, the NavSe server automatically creates resources related to a trip, route information, and traffic information to be provided to the application 2, without interaction with the application 2, which is the application of the user 2. The route information for the application 2 is in the direction opposite the direction of the route information for the application 1. In other words, the route information for the application 2 is for reaching the user of the application 1. When resources related to a trip, route information, and related traffic information are created, the NavSe server transmits a link, through which the created Trip resource is accessible, to the user using SMS, OMA Push, MMS, or the like through an external entity over a network. The application 2 accesses the trip information, the route information, and the traffic information by accessing the NavSe server. Then, the application 2 automatically subscribes to a notification service without interaction with the user 2 (the user of the application 2).

In order to enable the NavSe server to track the movement of the navigation devices related to the application 1 and the application 2, a positionUpdate field (parameter) in the route information is set to 'True'. When a navigation device enters a new segment, the application installed therein uploads the current position. When the navigation devices related to the application 1 and the application 2 are in the same segment, the applications upload the current positions of the navigation devices whenever they move a certain distance from the previous reporting positions. In terms of the shared route information, information about the movement and the position of one navigation device is very important to the application of the other navigation device. Whenever one application uploads current position information, the NavSe server may transmit the uploaded current position information, the remaining time, and the remaining distance to the other application. Through the above-described method, the number of interactions between the NavSe server and the NaveSe application may be reduced. That is, rather than using a method in which notification on the update of the position information is sent to the application and the application receives the updated position information by accessing the NavSe server, the present invention includes the updated position information in the notification message, thereby reducing the number of accesses by the application to the NavSe server. Also, the application uploads the current position information to the NavSe server only when the navigation device having the application enters a new segment, rather than continually or periodically uploading the current position. Therefore, the number of interactions between the NavSe server and the NavSe application may further reduced.

Hereinafter, operations performed for the resources described in the scenario for providing an interactive navigation service will be described.

The procedure to be described with reference to FIGS. 4A to 4C includes a description of the following operations that are performed for resources.

In order to define and modify trip parameters, creating and modifying resources under the following URL:
http://{serverRoot}/nayse/1/{appId}/trips In order to access the identifiers of the routes proposed for the defined trip, reading resources under the following URL:
http://{serverRoot}/nayse/1/{appId}/trips/{tripId}

In order to access information related to a summarized route, reading resources under the following URL:
http://{serverRoot}/nayse/1/{appId}/trips/{tripId}/routes/{routeId}/sumRoute In order to access information related to one or more routes in a full format, reading resources under the following URL:
http://{serverRoot}/nayse/1/{appId}/trips/{tripId}/routes/{routeId}

In order to access traffic events related to a route, reading resources under the following URL:
http://{serverRoot}/nayse/1/{appId}/events/{eventId}

In order to eliminate unnecessary routes, delete resources under the following URL:
http://{serverRoot}/nayse/1/{appId}/trips/{tripId}/routes/{routeId}

In order to subscribe to a notification service for a trip and related routes, creating a resource under the following URL:
http://{serverRoot}/nayse/1/{appId}/subscriptions (The server sends a notification to the URL specified in a subscription resource. The notification includes the URLs of the updated resources.)

In order to send an application a notification with the identifiers of the updated resources, creating resources under the resource defined by the application.

Figure 4A:
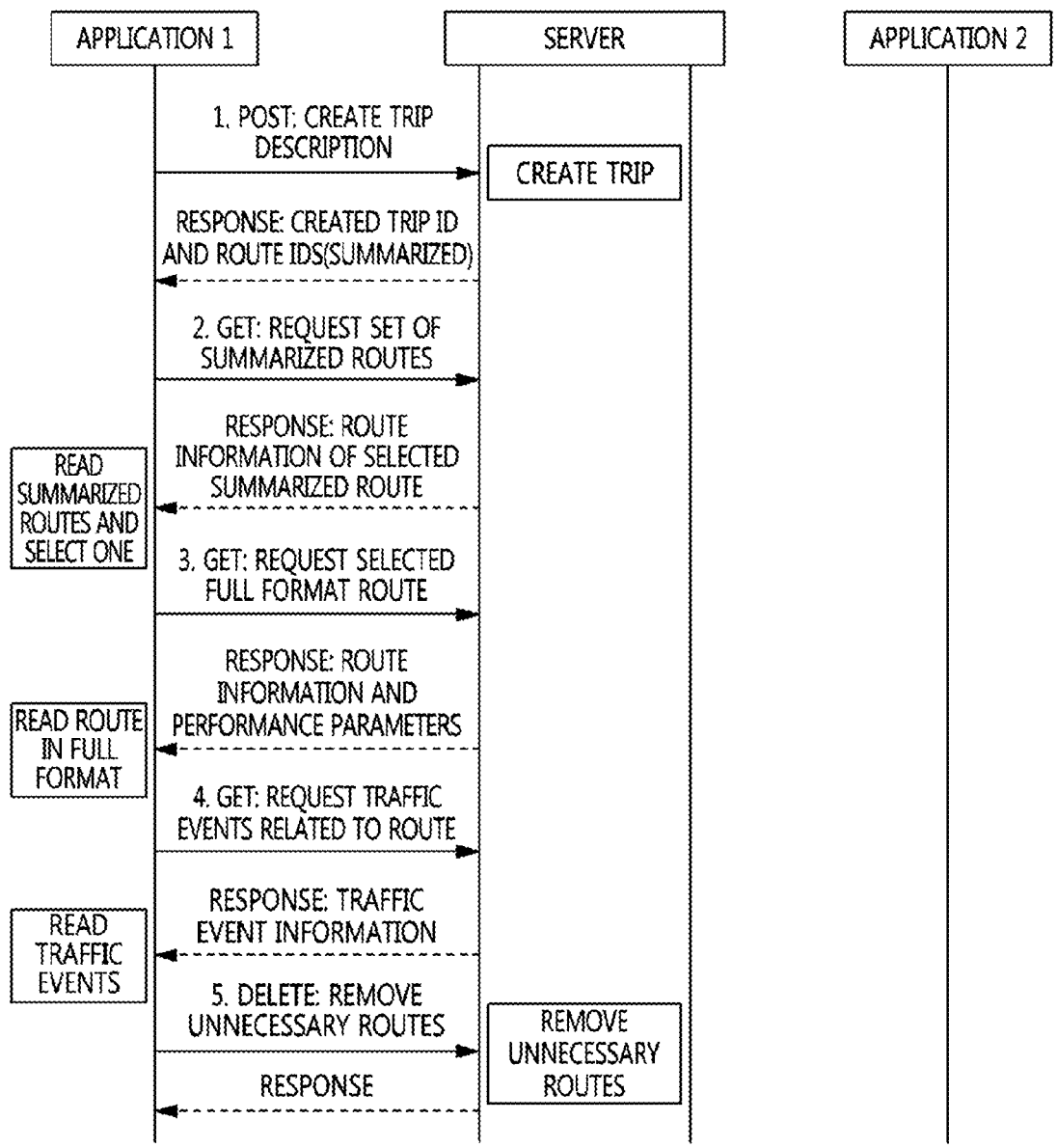
FIGS. 4A to 4C are flowcharts that show an interactive navigation service procedure according to an embodiment of the present invention.
Figure 4B:
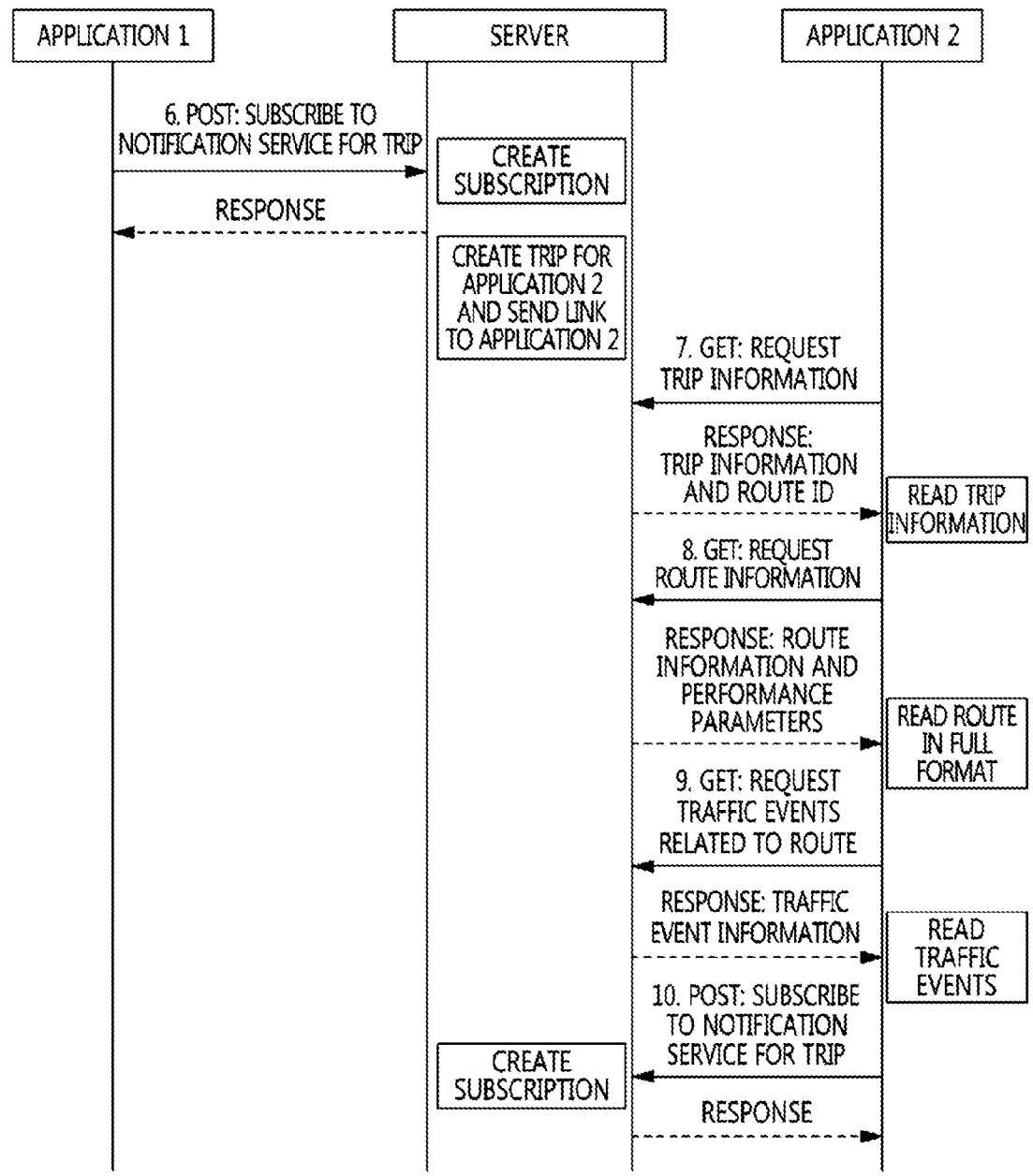
Figure 4C:
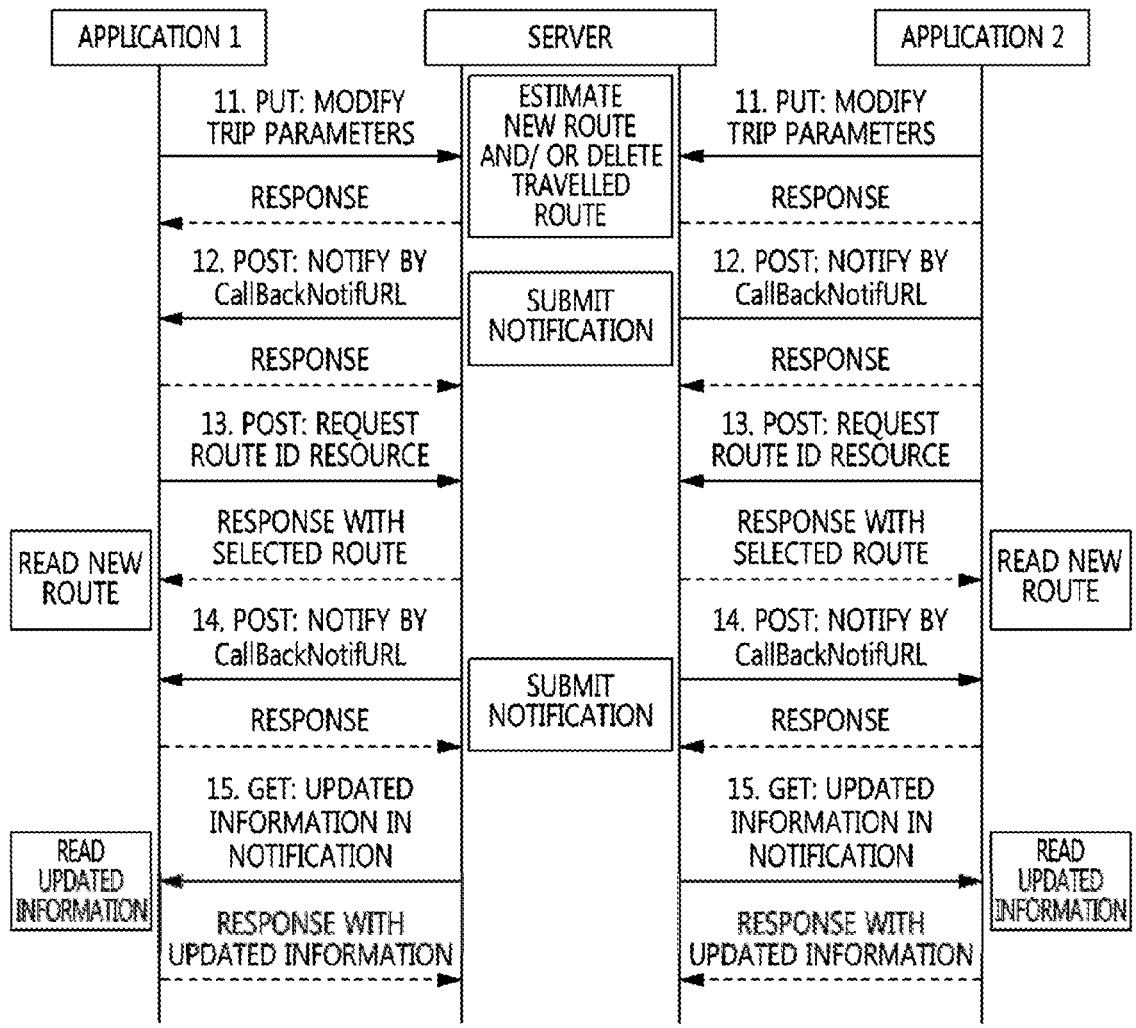

FIGS. 4A to 4C are flowcharts that show an interactive navigation service procedure according to an embodiment of the present invention.

(STEP 1) First, application 1 creates a trip resource using the journey parameters defined by user 1 using a POST method. In this scenario, an indicator (sharedRoute) for indicating that shared route information is requested is set to 'True', and the destination is defined using a target user ID corresponding to the user of application 2. The server proposes a set of routes for the journey along with traffic information related to the routes, and replies with a representation of a "trip" resource, which includes link(s) through which the proposed routes are accessible and the position information of the application 2 as the destination (destinationWGS84).

(STEP 2) The application 1 accesses the set of routes in a summarized format using a GET method. This step is repeated for all of the routes proposed by the server. However, when the length and complexity of the trip are limited and when network quality is adequate, route information in a full format may be used at this step, rather than in a summarized format. The application 1 may request shape information (WGS84 coordinates polyline) for the proposed routes from the server when it is not available in the navigation device.

(STEP 3) The user of the application 1 selects any one route from the proposed set of routes, and the application 1 accesses the full format information for the route selected by the user using a GET method. The application 1 may request shape information (WSG84 coordinates polyline) for the selected route if this information is not available in the navigation device. If the route in a full format has been acquired at STEP 2, STEP 3 may be skipped. The server replies with the selected route information along with traffic information related thereto.

(STEP 4) The application 1 uses a GET method to access traffic events related to the route in use via links to traffic event resources provided in the route representation. The access to the traffic events may be limited to the categories selected by the user.

(STEP 5) The application 1 eliminates unnecessary routes, which were proposed by the server but not selected by the user, using a DELETE method.

(STEP 6) The application 1 creates a subscription resource for a notification service for the trip using a POST method. The application 1 is notified by the server of the following events:

(a) an update on performance parameters and new traffic events (for selected categories) for all of the routes related to the trip (b) an alternative route proposed in the event of congestion of the route in use (c) a changed destination and/or an alternative route proposed when the application 1 and/or the application 2 move(s) more than a certain distance from the previous position After the application 1 creates a subscription resource for a notification service, the server automatically creates a Trip resource including route information and traffic information for the application 2. Then, the server delivers a link (i.e., URL) for accessing the Trip resource of the application 2 to the application 2 using OMA Push, MMS, SMS, or the like.

(STEP 7) After the application 2 receives the URL, the application 2 accesses the Trip resource, which includes a link through which the route information to be provided thereto is accessible, using a GET method.

(STEP 8) The application 2 accesses the full format information of the route using a GET method. The server replies with route information and traffic information related thereto.

(STEP 9) The application 2 accesses traffic events related to the route accessed at STEP 8 via links to the traffic event resources provided in the route representation using a GET method.

(STEP 10) The application 2 creates a subscription to a notification service for the trip using a POST method. The application 2 is notified by the server of the following events:

(a) an update on performance parameters and new traffic events (for selected categories) for all of the routes related to the trip (b) an alternative route proposed in the event of congestion of the route in use (c) a changed destination and/or an alternative route proposed when the application 1 and/or the application 2 enter(s) a new segment or move(s) more than a certain distance from the previous position(s)

(STEP 11) This step is triggered when any one of the following three cases occurs:

the user changes course and diverts from the route in use the user enters a new segment the user moves a certain distance from the previous reporting position in the state in which the application 1 and the application 2 are in the same segment.

When the user 1 (application 1) or the user 2 (application 2) changes course and diverts from the route in use, the application 1 or the application 2 modifies the origin parameter in the Trip resource using a PUT method. The server recognizes that the current position is not included in the route in use and calculates a new route with the new origin. The server replies to the PUT method with a link through which the new route included in the Trip resource is accessible and deletes the old route.

In the other cases, the application 1 or the application 2 modifies the origin parameter in the Trip resource using a PUT method, and, using this information, the NavSe server deletes already traveled segments from the route presentation.

(STEP 12) The server sends a notification to another application that does not perform STEP 11 (for example, the server may send the notification to the application 2 if the application 1 modifies the origin parameter). If the server calculates the new route with the new origin at STEP 11, the server reports a link for accessing the updated information. Otherwise, the server sends a notification including the position of another application, the remaining time, and distance information.

(STEP 13) This step is triggered only when the server reports the link for accessing the new route information at STEP 12. Otherwise, this step may be skipped. The application 1 and the application 2 access the newly proposed route, performance parameters, and traffic events using a GET method. Because the applications have subscribed to the notification service for the Trip resource, the subscription will cover the newly proposed route.

(STEP 14) When the server detects traffic events and/or severe congestion of the proposed routes, the server reports a link to the updated information using a POST method.

(STEP 15) The application 1 and the application 2 access the updated information for the route in use, new traffic events related thereto, and/or the proposed alternative route using a GET method. Because the subscription to the notification service includes all of the routes related to the trip, the notification will be extended so as to cover the proposed alternative route.

Figure 5:
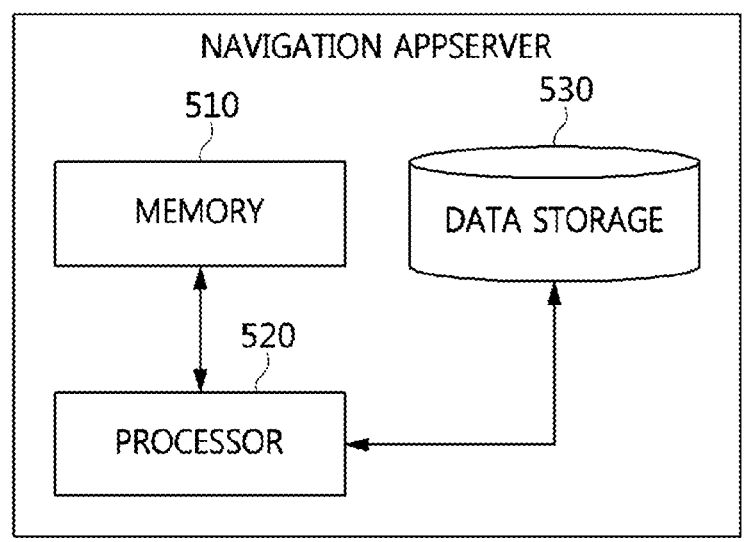
FIG. 5 is an exemplary block diagram of a navigation service server configured to implement embodiments of the present invention.

FIG. 5 shows an exemplary block diagram of a navigation service server configured to implement embodiments of the present invention.

As shown in FIG. 5, a navigation service server includes at least one processor 520, data storage 530, and memory 510 including instructions. When the instructions are executed by the processor 520, the processor 520 is made to operate as follows.

In response to a request from a first client to create a representation of a first trip from the first client to a second client, the processor 520 may allocate the data storage 530 for the representation of the first trip. Here, the data storage 530 is allocated in order to store the parameters of the first trip. The representation of the first trip has a related URL. The parameters of the first trip include an origin and a destination, and the destination is set to the identifier of the second client.

The processor 520 may allocate the data storage 530 for each of a representation of a route calculated for the first trip and a representation of traffic information related to the calculated route. Each of the representation of the route calculated for the first trip and the representation of the traffic information related to the calculated route has a related URL.

The processor 520 may allocate the data storage 530 for a representation of a second trip from the second client to the first client regardless of whether or not the second client makes a request. Here, the data storage 530 is allocated in order to store the parameters of the second trip. The representation of the second trip has a related URL. The parameters of the second trip include an origin and a destination, and the destination is set to the origin of the first client.

The processor 520 may allocate the data storage 530 for each of a representation of a route calculated for the second trip and a representation of traffic information related to the calculated route. Each of the representation of the route calculated for the second trip and the representation of the traffic information related to the calculated route has a related URL.

The processor 520 may deliver the URL related to the representation of the second trip to the second client. The representation of the second trip may include a parameter that represents a link to the representation of the route calculated for the second trip and the representation of the traffic information related to the calculated route.

The second client may acquire the parameters of the representation of the second trip by performing an HTTP GET operation for the URL related to the representation of the second trip, and may acquire the route calculated for the second trip and the traffic information related thereto using the HTTP GET operation for the link to the representation of the route calculated for the second trip and the representation of the traffic information related thereto.

When it recognizes modification of a parameter in the first trip resource that reports deviation of the first client from the route in use, the processor 520 may calculate a new route corresponding to the current position of the first client and notify the first client and the second client of the URL of the new route.

When it recognizes modification of a parameter in the first trip resource that reports entry of the first client into a new segment in the route in use, the processor 520 may send the second client a notification message, which includes position information of the first client, the time remaining until the first client and the second client meet, and the distance therebetween.

When it recognizes modification of a parameter in the first trip resource and modification of a parameter in the second trip resource that report entry of the first client and the second client into the same segment, the processor 520 may transmit position information of the first client to the second client and transmit position information of the second client to the first client.

Although the processes illustrated in FIG. 2 and FIG. 4 have been described as being sequentially performed, this is only an exemplary description of the technical idea of an embodiment of the present invention. Those skilled in the art will appreciate that the processes illustrated in FIG. 2 and FIG. 4 may be variously changed or modified by changing the order of steps shown in FIG. 2 and FIG. 4, or by performing one or more steps in parallel without departing from the features of an embodiment of the present invention. Therefore, the processes illustrated in FIG. 2 and FIG. 4 are not limited to the temporal order shown.

Meanwhile, the steps in the flowcharts illustrated in FIG. 2 and FIG. 4 can be embodied as computer-readable code on a computer-readable recording medium. The computer-readable recording medium includes all kinds of data storage devices that can store data that can be read by a computer system. Examples of the computer-readable recording medium include magnetic storage media (e.g., ROM, RAM, a floppy disk, a hard disk and the like) and optical recording media (e.g., a CD-ROM, a DVD, and the like). The computer-readable recording medium can also be distributed over computer systems connected through a network so that the computer-readable code is stored and executed in a distributed manner.

As described above, according to the embodiments of the present invention, a rescue worker may quickly provide an emergency service by quickly reaching the person who requested rescue through an interactive navigation service therebetween. Furthermore, the person who requested rescue may also proceed to the rescue worker by detecting the position of the rescue worker through the interactive navigation service.

The above description is merely intended to illustratively describe the technical spirit of the present invention, and various changes and modifications can be made by those skilled in the art to which the present invention pertains without departing from the essential features of the present invention. Therefore, the embodiments disclosed in the present invention are not intended to limit the technical spirit of the present invention, but are intended to describe the present invention. The scope of the spirit of the invention is not limited by these embodiments. The scope of the present invention should be defined by the accompanying claims, and all technical spirits falling within the equivalent scope thereof should be interpreted as being included in the scope of the present invention.

What is claimed is:

1. A method in which a navigation service server provides a shared route service to clients, comprising:
   creating a first trip resource including parameters for representing a first trip from a first client to a second client in response to a request of the first client, a destination parameter of the first trip being set to an identifier of the second client;
   creating first trip-related resources for representing a first route information and a first traffic information corresponding to the first trip;
   creating a second trip resource corresponding to the first travel resource including parameters for representing a second trip from the second client to the first client, regardless of whether or not the second client makes a request, a destination parameter of the second trip being set to a position of the first client; and
   creating second trip-related resources for representing a second route information and a second traffic information corresponding to the second trip,
   wherein when a first client application subscribes to a notification service, the navigation service server automatically creates the first client trip information, route information, and related traffic information for the second client without interaction with a second client application; and
   wherein after first trip-related resource are created, the navigation service server transmits the created first trip-related resource to the second client, and after a second client application receives the route and traffic information, the second client application automatically subscribes to the notification service without interaction with the second client.

2. The method of claim 1, further comprising: acquiring position information of the second client corresponding to the identifier of the second client thereof from an external entity over a network.

3. The method of claim 1, further comprising: delivering a URL through which the second trip resource is accessible to the second client, wherein the second trip resource includes a parameter representing links of the second trip-related resources.

4. The method of claim 3, wherein the second client is configured to:
acquire parameters of the second trip resource by performing a hypertext transfer protocol (HTTP) GET operation for the URL; and
receive the second route information and the second traffic information by performing the HTTP GET operation for the links of the second trip-related resources.

5. The method of claim 1, wherein:
the first route information includes an indicator for instructing the first client to modify a parameter in the first trip resource that represents position information of the first client when the first client enters a new segment; and
the second route information includes an indicator for instructing the second client to modify a parameter in the second trip resource that represents position information of the second client when the second client enters a new segment.

6. The method of claim 1, further comprising: when modification of a parameter in the first trip resource that reports deviation of the first client from a route in use is recognized, calculating a new route matching a current position of the first client and notifying the first client and the second client of a URL of the new route.

7. The method of claim 1, further comprising:
sending a notification message to the second client when modification of a parameter in the first trip resource that reports entry of the first client into a new segment in a route in use is recognized,
wherein the notification message includes position information of the first client, information about travel time remaining until the first client and second client meet, and information about a distance between the first client and the second client.

8. The method of claim 1, further comprising: sending position information of the first client to the second client and sending position information of the second client to the first client when modification of a parameter in the first trip resource and modification of a parameter in the second trip resource that report entry of the first client and the second client into a same segment are recognized.

9. A method in which a navigation service server provides a shared route service to clients, comprising:
in response to a request from a first client to create a representation of a first trip from the first client to a second client, allocating data storage for the representation of the first trip, the data storage being allocated in order to store parameters of the first trip, the representation of the first trip including a related URL, the parameters of the first trip including an origin and a destination, and the destination being set to an identifier of the second client;
allocating data storage for each of a representation of a route calculated for the first trip and a representation of traffic information related to the calculated route;
allocating data storage for a representation of a second trip from the second client to the first client regardless of whether or not the second client makes a request, the data storage being allocated in order to store parameters of the second trip, the representation of the second trip including a related URL, the parameters of the second trip including an origin and a destination, and the destination being set to the origin of the first client; and
allocating data storage for each of a representation of a route calculated for the second trip and a representation of traffic information related to the calculated route,
wherein when a first client application subscribes to a notification service, the navigation service server automatically creates the first client trip information, route information, and related traffic information for the second client without interaction with a second client application; and
wherein after first trip-related resource are created, the navigation service server transmits the created first trip-related resource to the second client, and after a second client application receives the route and traffic information, the second client application automatically subscribes to the notification service without interaction with the second client.

10. A navigation service server for providing a shared route service to clients, comprising:
at least one processor;
data storage; and
memory including instructions,
wherein, when the instructions are executed by the processor, the processor is made to perform:
allocation of the data storage for a representation of a first trip from a first client to a second client in response to a request from the first client to create the representation of the first trip, the data storage being allocated in order to store parameters of the first trip, the representation of the first trip including a related URL, the parameters of the first trip including an origin and a destination, and the destination being set to an identifier of the second client;
allocation of the data storage for each of a representation of a route calculated for the first trip and a representation of traffic information related to the calculated route;
allocation of the data storage for a representation of a second trip from the second client to the first client regardless of whether or not the second client makes a request, the data storage being allocated in order to store parameters of the second trip, the representation of the second trip including a related URL, the parameters of the second trip including an origin and a destination, and the destination being set to the origin of the first client; and
allocation of the data storage for each of a representation of a route calculated for the second trip and a representation of traffic information related to the calculated route,
wherein when a first client application subscribes to a notification service, the navigation service server automatically creates the first client trip information, route information, and related traffic information for the second client without interaction with a second client application; and
wherein after first trip-related resource are created, the navigation service server transmits the created first trip-related resource to the second client, and after a second client application receives the route and traffic information, the second client application automatically subscribes to the notification service without interaction with the second client.

* * * * *